Jan. 20, 1953 C. J. THOMPSON ET AL 2,625,761
ADVERTISING ATTACHMENT FOR PARKING METERS
Filed Jan. 30, 1950
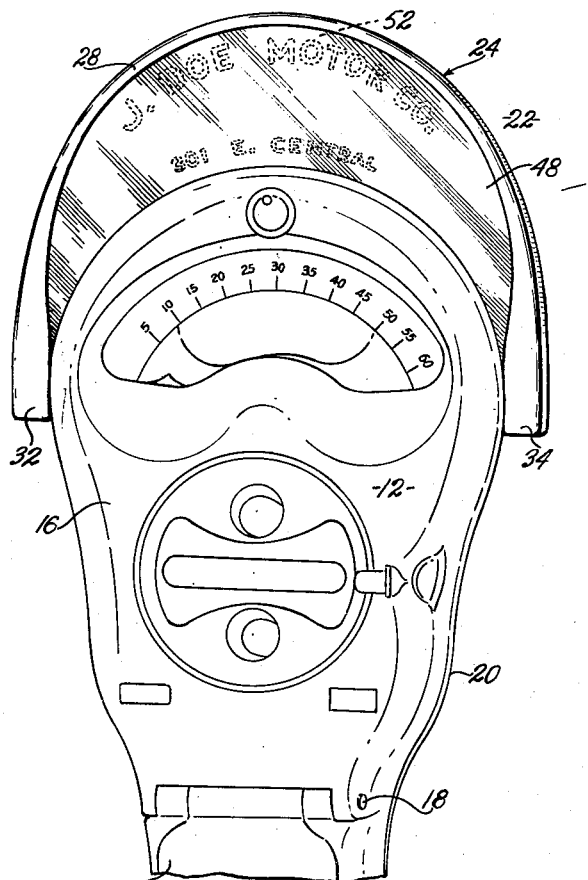
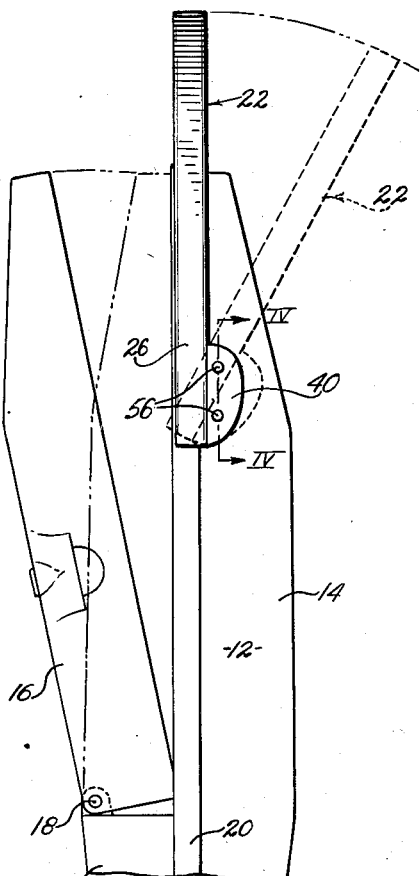
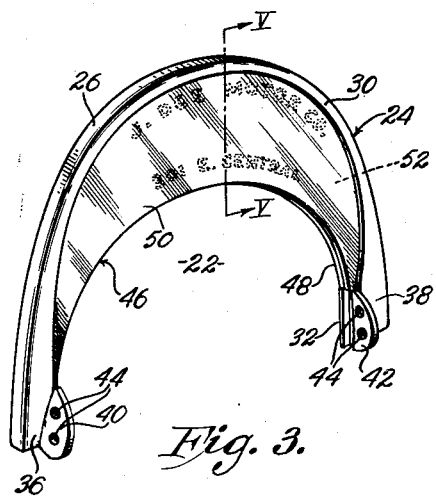
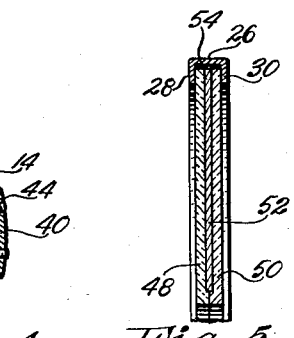
INVENTORS.
Charles J. Thompson
Raymond C. Johnson
BY
ATTORNEY.

Patented Jan. 20, 1953

2,625,761

UNITED STATES PATENT OFFICE 2,625,761

ADVERTISING ATTACHMENT FOR PARKING METERS

Charles J. Thompson and Raymond C. Johnson, Miami, Okla.

Application January 30, 1950, Serial No. 141,189

2 Claims. (Cl. 40—145)

1

This invention relates to the field of advertising generally and has to do more specifically with the provision of an attachment having advertising indicia thereon that is adapted to be mounted upon conventional automobile parking meters or like standards, the primary object being to provide a device that is universally adaptable for mounting upon various types of meters and other supports of like nature.

It is the most important object of the present invention to provide an attachment for parking meters and the like, the attachment per se including an open frame that is U-shaped in cross-section for receiving an advertising unit, the frame being formed to embrace a portion of the meter and the unit conforming to the contour of the meter housing and resting thereupon.

A further object of the present invention is to provide an advertising attachment of the aforesaid character wherein the advertising unit thereof is interchangeable and capable of being formed so as to conform to the contour of the meter irrespective of its shape, size and other characteristics.

A further object of the invention is to provide an advertising attachment wherein the frame, as well as the advertising unit thereof, are relatively rigid and attached to the meter in a manner to withstand breakage when leaned upon or tampered with through vandalism.

Other objects include the way in which the unitary advertising portion of the attachment is formed from strong, transparent material that is pocketed to receive interchangeable advertising cards; the way in which the entire attachment is made to permit mounting without interfering with the use and operation of the meter itself; and the way in which the attachment is formed to permit ready and simple interchanging of the advertising units as desired.

More minor objects including details of construction, will become apparent as the following specification progresses, reference being had to the accompanying drawing, wherein:

Figure 1 is an elevational view of an advertising attachment made in accordance with our present invention showing the same operably mounted upon the casing of a conventional parking meter.

Fig. 2 is a side elevational view thereof, illustrating the manner of interchanging the advertising unit.

Fig. 3 is a perspective view of the attachment per se.

Fig. 4 is a fragmentary, detailed, cross-sectional view taken on line IV—IV of Fig. 2; and Fig. 5 is a transverse, cross-sectional view taken on line V—V of Fig. 3.

In Figs. 1 and 2 of the drawing, there is illustrated a parking meter of usual construction now commonly used in many cities and mounted upon suitable standard 10.

The meter illustrated has a hollow case broadly designated by the numeral 12, including a rigid section 14 and a section 16 that is swingable to and from a closed position as illustrated in Fig. 2 and upon a horizontal axis 18.

In this particular type of meter, all of the operating mechanism is mounted within the hollow section 16 and is swingable therewith when the meter is opened to repair such mechanism and remove accumulated coins. It is noted that the rigid section 14 of the casing 12 is provided with a continuous channel-like flange 20 that receives the swingable section 16 when the latter is in the closed position and it is contemplated that the attachment forming the subject matter hereof, rest directly upon flange 20 when the same is operably secured to the casing 12.

The advertising attachment hereof is broadly designated by the numeral 22 and includes a substantially semi-circular frame 24, it being understood, however, that the precise shape of frame 24 is of no consequence except from the standpoint of appearance, so long as the same is open at one side thereof to receive the housing 12.

The frame 24 is U-shaped in cross-section throughout its entire length presenting a bight 26 and a pair of substantially parallel legs 28 and 30. Each of the legs of the flange 28 of frame progressively increases in width as the normally lowermost free ends thereof are approached to present a pair of wings 32 and 34.

Flange 30 is formed in the same manner to present a pair of wings 36 and 38 that are substantially identical with wings 32 and 34. Wings 36 and 38 are in turn provided with integral, laterally extending ears 40 and 42 respectively and each of the ears 40 and 42 is in turn provided with a pair of internally tapped openings 44. Frame 24 is adapted to receive a crescent-shaped insert or advertising unit 46 that includes a pair of face-to-face transparent plates 48 and 50 having a pocket therein for receiving an advertising card 52. The lowermost arcuate edges of the plates 48 and 50 are permanently sealed together and after the advertising card 52 is moved into place, the uppermost arcuate edges of the plates 48 and 50 are closed with a suitable seal 54. The entire unit 46 is then fittable within the frame 24 for free removal and replacement with other units 46 as desired. Note that the marginal edges of the plates 48 and 50 are embraced by the flanges 28 and 30 and that the entire arcuate seal 54 bears against the innermost face of the bight 26 of frame 24. With the unit 46 and frame 24 thus interconnected, the entire attachment 22 is placed upon the uppermost arcuate surface of the casing 12 and particularly upon the flange portion 20 thereof. By opening of the section 16 of casing 12, attachment can be made through the medium of screws 56 that extend from within the section 14 through the side wall thereof and into threaded engagement with the four openings 44 of ears 40 and 42 respectively.

If desired, a suitable seal such as glue or a gasket between the heads of screws 56 and the innermost face of the section 14, may be provided to positively prevent leakage of moisture into the casing 12. After the section 16 of casing 12 is moved to the closed position and locked in place, the attachment 22 is likewise not readily removable from the meter by unauthorized persons except by breakage because of the form and manner of fastening the screw elements 56. When it is desired to replace the units 46 or remove the same from frame 24 for any purpose, the screws 56 of each ear 40 and 42 are removed while section 16 is open. The entire attachment 22 may thereupon be removed from its normal vertical position, thereby permitting replacement of a new unit. It is seen that through such construction, units 46 may be fabricated and made ready for insertion at the factory and easily and quickly interchanged on the street without necessitating changing of the entire attachment 22.

Another advantage of providing a unitary insert 46 lies in the fact that the innermost arcuate contour of the plates 48 and 50 may be shaped to fit the contour of the flange 20 and thereby render the entire attachment universally adaptable for use with various types of meters and other supports.

If it is desired to change the cards 52 of the replaced units 46, seal 26 is broken and the plates 48 and 50 thereupon re-sealed prior to further use.

Any suitable plastic material for instance, may be used for the transparent plates 48 and 50 as well as for the sealing means therefor and the cards 52 are maintained in a water-proof condition throughout their use within frame 24.

It is obvious that the attachment 22 will undergo some abuse on the street because of leaning thereupon, as well as because of vandalism and it is for this reason that the frame 24 has been strengthened with the wings 32, 34, 36 and 38. Ears 40 and 42 integral with the wings 36 and 38 respectively, are not easily broken even though a substantial amount of pressure is applied to the frame 24 and unit 46 therewithin.

Manifestly, such details of construction that might be modified in the attachment hereof and fairly come within the spirit of the invention, are contemplated hereby and it is, therefore, desired to be limited only by the scope of the appended claims.

Having thus described our invention, what we claim as new and desire to secure by Letters Patent is:

1. For parking meters having a case provided with an arcuate, uppermost surface, an advertising attachment comprising a loop-shaped frame member, U-shaped in cross-section, presenting an arcuate bight and a pair of spaced, arcuate legs, said legs progressively increasing in width as the normally lowermost free ends thereof are approached; a substantially crescent-shaped advertising unit having a normally uppermost, arcuate edge, conforming to the contour of and engaging the innermost face of said bight between said legs, and a normally lowermost, arcuate edge, conforming to the contour of and engageable with said surface of the case; a pair of opposed, laterally-extending ears on one of said legs, there being an ear adjacent each of said normally lowermost free ends respectively of said one leg and adapted to engage the case when the attachment is mounted thereon; and fastening elements for each ear respectively adapted to secure the frame member to the case and hold the advertising unit clamped tightly between said bight and said surface.

2. For parking meters having a case provided with an arcuate, uppermost surface, an advertising attachment comprising a loop-shaped frame member, U-shaped in cross-section, presenting an arcuate bight and a pair of spaced, arcuate legs, said legs progressively increasing in width as the normally lowermost free ends thereof are approached; a substantially crescent-shaped advertising unit having a normally uppermost, arcuate edge, conforming to the contour of and engaging the innermost face of said bight between said legs, and a normally lowermost, arcuate edge, conforming to the contour of and engageable with said surface of the case; a pair of opposed, laterally-extending ears on one of said legs, there being an ear adjacent each of said normally lowermost free ends respectively of said one leg and adapted to engage the case when the attachment is mounted thereon; and fastening elements for each ear respectively adapted to secure the frame member to the case and hold the advertising unit clamped tightly between said bight and said surface, said unit comprising an advertising card, a transparent covering for said card having a card-receiving pocket therein, and a pair of opposed, flat faces, and means for sealing said pocket closed, said sealing means bearing against the bight and said legs being in overlapped engagement with the proximal marginal edges of said faces of the covering.

CHARLES J. THOMPSON.
RAYMOND C. JOHNSON.

REFERENCES CITED

The following references are of record in the file of this patent:

UNITED STATES PATENTS

| Number | Name | Date |
|---|---|---|
| 802,513 | Johnson | Oct. 24, 1905 |
| 861,250 | Bartle | July 30, 1907 |
| 1,531,017 | Miller | Mar. 24, 1925 |
| 1,682,047 | Lang | Aug. 28, 1928 |
| 2,070,652 | Elmer | Feb. 11, 1937 |
| 2,123,801 | Raizner | July 12, 1938 |